Feb. 28, 1967  C. W. ISELIN  3,305,932
INSPECTION EQUIPMENT HOLDER AND POSITIONING APPARATUS
Filed June 26, 1964  2 Sheets-Sheet 2

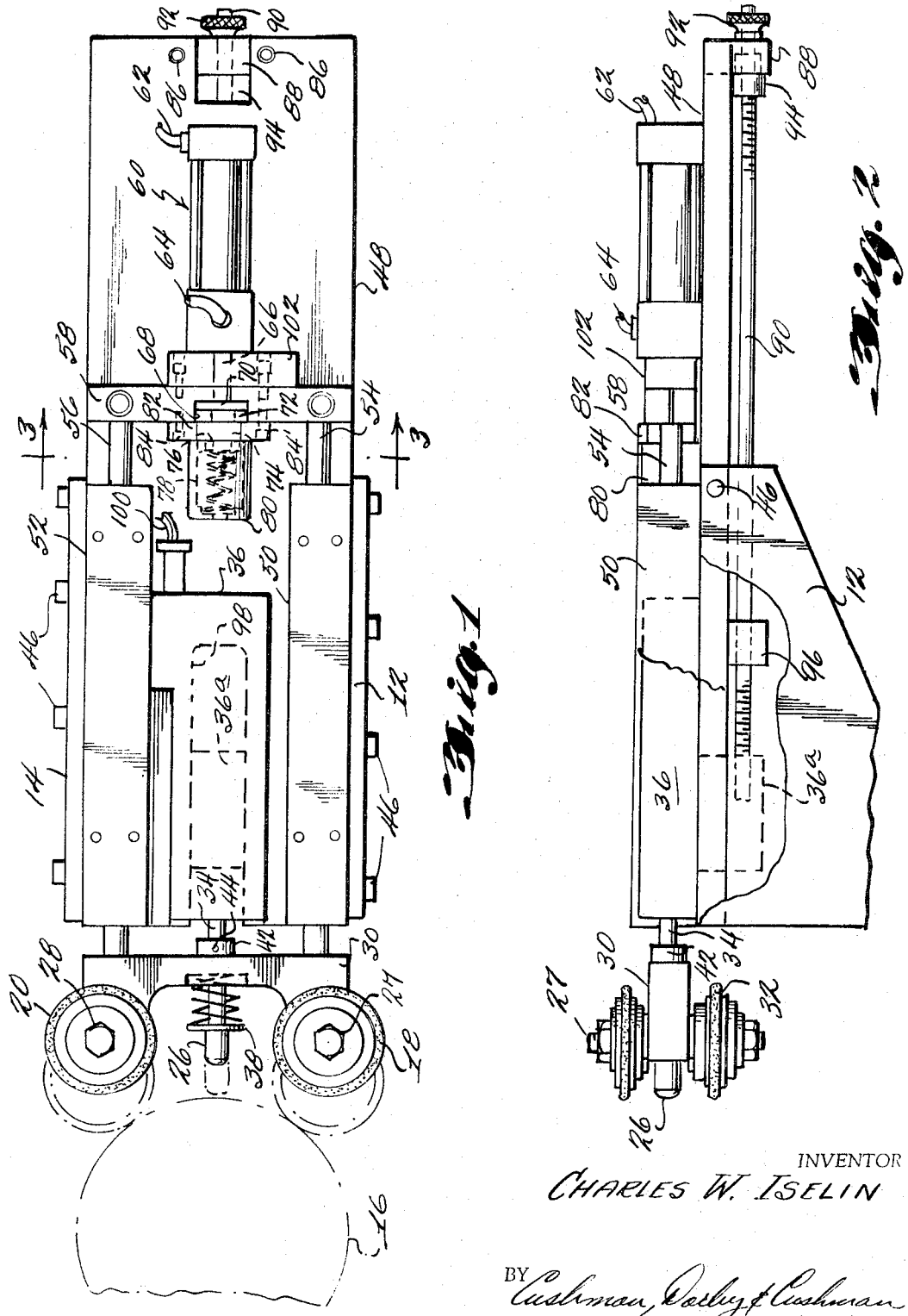

INVENTOR
CHARLES W. ISELIN
BY Cushman, Darby & Cushman
ATTORNEYS

United States Patent Office 3,305,932
Patented Feb. 28, 1967

3,305,932
INSPECTION EQUIPMENT HOLDER AND
POSITIONING APPARATUS
Charles W. Iselin, Elmira, N.Y., assignor, by mesne assignments, to Rexall Drug and Chemical Company, Los Angeles, Calif., a corporation of Delaware
Filed June 26, 1964, Ser. No. 378,402
3 Claims. (Cl. 33—178)

This invention relates to apparatus for positioning an object for inspection and for holding the inspection equipment.

In the specific embodiment described with reference to the drawings, the apparatus relates to a holder by which bottles or other types of round objects coming along a conveyor line may be inspected for out-of-round or like type conditions. Transducer equipment for sensing such conditions and making an indication relative thereto is disclosed in the copending Banks et al. application, Serial No. 230,651, filed October 15, 1962, and entitled, "Out-of-Roundness and Diameter Gage."

However, the holding equipment of the present invention may be used to mount other types of inspection equipment, for example equipment for photoelectrically inspecting bottles for splits or cracks, as well as various other types of inspection equipment utilized in the bottle making industry for example.

It is a primary object of this invention, therefore, to provide improved apparatus for holding inspection equipment and positioning an object which is to be inspected thereby.

A further and specific object of this invention is to provide such holding equipment that may be moved forwardly to position the object to be inspected and withdrawn therefrom, with the forward movement being accomplished by a motor driven compression spring so that the force against the object being inspected is that of the spring itself.

Still another object, in conjunction with the preceding objects, is the provision of an out-of-round transducer adjustably positioned on the holding equipment and having a forward extending probe which is decoupled by a spring from the movement of the idler wheels positioned against the rotating object being inspected, so that the probe will follow changes in diameter of the object independently of any movements by those wheels.

Other objects and advantages of this invention will become apparent to those of ordinary skill in the art upon reading the appended claims and the following detailed description of the invention in conjunction with the attached drawings, in which:

FIGURE 1 is a plan view of the holding equipment with an out-of-round transducer installed;

FIGURE 2 is a side elevational view of the equipment of FIGURE 1;

Figure 3:
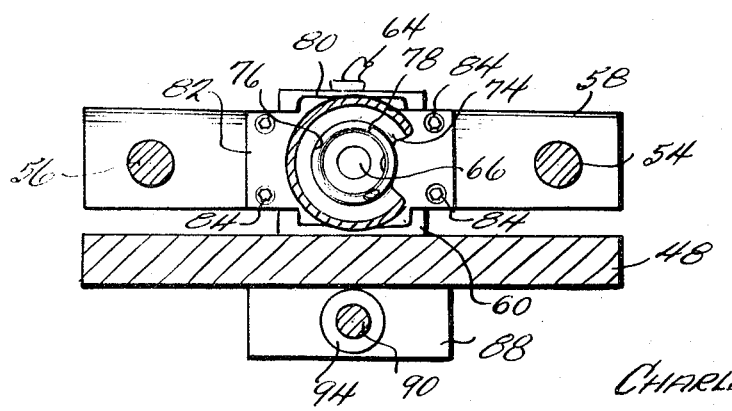
FIGURE 3 is a cross-sectional view taken substantially along the lines 3—3 of FIGURE 1.

The equipment in FIGURES 1, 2 and 3 is designed to be mounted along the side of a conveyor 10 (FIGURE 4) by the two mounting brackets 12 and 14 on opposite sides of the equipment, in any suitable manner. Though not shown, the equipment may be so mounted as to provide for vertical adjustment thereof.

Figure 4:
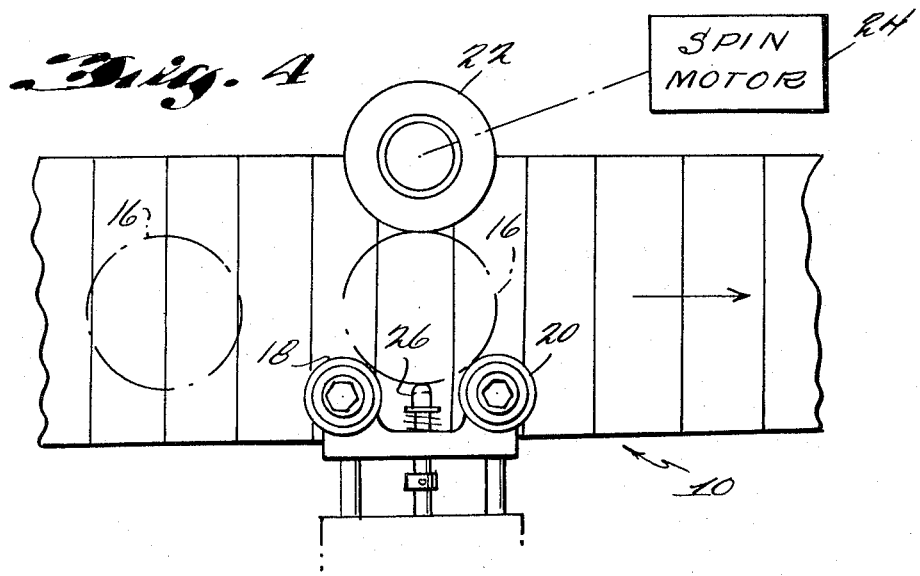
FIGURE 4 is a fragmentary plan view, partially diagrammatic, illustrating a portion of the equipment in FIGURE 1.

In the FIGURE 4 illustration, a bottle or other object 16 being inspected has come along the conveyor line to the inspection station in conventional manner, as by being timed therein by a screw, star wheel, or a reciprocating gate (not shown). As a bottle enters the inspection area, it is sensed in any conventional manner, such as by a limit switch, photoelectric system, or sonic system (not shown). This causes the positioning and holding equipment of this invention, including idler wheels 18 and 20 to move forwardly against bottle 16 and to press it into contact with a spin wheel 22 on the opposite side of the conveyor. After such contact, spin motor 24 operates to rotate wheel 22 and thereby spin bottle 16. Transducer probe 26 varies in its longitudinal position with variations in diameter of the bottle, to provide an out-of-round indication in the manner fully described in the above mentioned Banks et al. application.

As may be noted in FIGURE 1, idler wheels 18 and 20 are mounted for free rotation on respective vertical axles 27 and 28, which journrnal in a bridge or yoke 30. As shown in FIGURE 2, axle 27 extends not only above bridge 30, but also below that bridge to mount another idler wheel 32. In like manner, axle 28 mounts another idler wheel (not shown) on its lower end. Axles 27 and 28 may be replaced by others of greater length so that the upper and lower idler wheels may accommodate different size and shape bottles or the like.

Probe 26, which may be made of 3/16 inch nylon for example, is secured to a shaft 34, which extends from the transducer housing 36 forwardly through a centered aperture in bridge 30. Positioned between a washer 38 adjacent bridge 26 and a countersunk aperture on the forward side of bridge 30 is a spring 40, which tends to push probe 26 forwardly. However, on the rear side of bridge 30 is a bushing or collar 42 which is secured by a set screw 44 to shaft 34, thereby limiting the forward movement of that shaft and of probe 26. Oilite bushings may be used in bridge 30 for reducing the friction of shaft 34 as it passes therethrough, thereby allowing probe 26 to follow better the fast changes in diameter of bottle 16.

Plates 12 and 14, as previously indicated, mount the holding equipment, and this is by virtue of their connection by bolts 46 to the platform 48 which supports the transducer housing 36 and the rest of the equipment. On the forward top sides of platform 48 are respective metal blocks 50 and 52 through an aperture (and bushings, as desired) in which parallel transversely spaced shafts or rods 54 and 56 may slide. At their forward ends, these rods are threaded or otherwise secured to opposite ends of bridge 30, and at their rearward ends these rods are clamped or otherwise secured to a rear yoke or bridge 58. This bridge is movable relative to platform 48.

To effect movement of rear bridge 58, and consequently of front bridge 30 and probe 26, a fluid motor such as air cylinder 60 may be employed. A fourway valve (not shown) or the like may be used to force air at high speed in and out of connections 62 and 64, thereby causing piston rod 66 to move rapidly forwardly and rearwardly. This rod extends through an aperture in the center of bridge 58 which is recessed at 68 to receive a nylon spacer or shock absorber 70 and a jam nut 72 along with another nut 74 both of which are threaded onto the outer end of piston shaft 66. On its forward face, nut 74 has a groove 76 in which is disposed the rear end of a compression spring 78. The forward end of that spring presses against a recess in the inside end surface of a top hat shaped element 80 which has a flange 82 secured to bridge 58 by four screws 84. As shown in FIGURE 3, element 80 has a portion of one side cut away and this is for the purpose of enabling access to nuts 72 and 74 inside. Nut 74 may be fixedly secured to piston shaft 66 by means of a set screw (not shown), and a short tool may be used to turn jam nut 72.

For purposes of adjusting the position of transducer housing 36, there is secured at the rear end of platform 48, as by screws 86, an inverted T-shaped element 88 the leg of which protrudes upwardly into an aperture in the platform with the arms extending below as illustrated in FIGURE 2. A shaft 90 threaded on opposite ends passes through an aperture in element 88 and fixedly connects to a knurled adjusting knob 92. On the inner side of element 88 is a retainer 94 which fits into the aperture in element 88 and threadedly receives shaft 90. Knob 92 and retainer 94 prevent shaft 90 from moving longitudinally when it is rotated by knob 92. This shaft passes through a guide or bearing block 96, which is secured to the underside of platform 48. The other end of shaft 90 is threaded into a depending portion 36a of transducer housing 36. This dependent portion protrudes downwardly through a slot 98 (FIGURE 1) in platform 48. Therefore rotation of knob 92 will move transducer housing 36 forwardly or rearwardly.

As fully explained in the above-mentioned Banks et al. application, the transducer probe is an extension of the movable armature of a linear variable differential transformer. Therefore, movement of the transducer housing 36 forward or aft by knob 92, will change the relative position of the transformer armature and its surrounding coils. This is desirable in order that the exact relationship desired therebetween during inspection of any given size bottle or the like may be established. Electrical signals from the transformer in housing 36 are brought out through a cable 100, which may extend to electronic circuitry such as that set forth in the aforementioned Banks et al. application.

From the foregoing description of the equipment, it should be apparent that when air cylinder 60 is energized to cause piston rod 66 to move forwardly, pressure is thereby placed upon the rear end of compression spring 78 the forward end of which in turn pushes forwardly on top hat element 80, and element 80 therefore pulls bridge 58 forwardly. Preferably, the piston rod is extended its full travel during the inspection time, and the force of idler wheels against the bottle being inspected is that of spring 78. This accomplishes three things: (1) the force on the bottle is independent of the force on the air cylinder, allowing independent control of speed of air cylinder 60, (2) the force on the bottle is at a minimum when the bottle is centered between the idler wheels, and (3) the mass and hysteresis (static friction) of the moving part in contact with the bottle is at minimum. It is preferred that everything possible be done to reduce such hysteresis, including use of ball bushings in blocks 50 and 52 and special grinding of rods 54 and 56, whereby the idler wheels and the moving equipment as a whole will better follow fast changes in diameter of the bottle.

Probe spring 40 is normally slightly compressed when collar 42 is against bridge 30 while the idler wheels are retracted. This spring has a relatively flat force to length curve, and by virtue of this, the movement of the probe during inspection is decoupled from and relatively independent of movement of the idler wheels. In other words, any forward or rearward movement of the idler wheels during inspection may tend to change the position of bridge 30, but spring 40 immediately compensates for this change to maintain a relatively constant pressure by probe 26 on the bottle being inspected. As exemplary, a pressure of four pounds per square inch may be utilized for the probe, while the idler wheels effect a pressure of substantially greater force, say 20 pounds per square inch.

Before retracting the equipment from the bottle being inspected, the bottle rotation is decelerated by any desired type of apparatus, for example a timer (not shown) turns off spin motor 24.

When air cylinder 60 is energized to cause its piston rod 66 to move rearwardly after the bottle has stopped spinning, it will be noted that spring 78 does not become involved in causing this movement since rod 66 pulls nuts 72 and 74 rearwardly against the nylon shock absorber 70, quite rapidly, with spring 78 naturally following. Element 102 may be placed between bridge 58 and the forward end of cylinder 60 for shock absorbing purposes, as desired.

As mentioned, the speed of operation of cylinder 60 can be controlled pneumatically. Usually high speed is desired and over sized valves and piping are used with high pressure air. The device can be delayed from operating by using a pilot valve and throttling the pilot exhaust. Normally a four way pilot operated double solenoid spool valve is used. This valve is cocked in one direction by only pulsing one pilot, allowing faster operation of the spool in the one direction. The exhaust of the other pilot is throttled, delaying the action in the other direction.

A switch may be installed on platform 48 to sense the position of the moving parts, for example it may be located to be operated by the rear surface of the leftward protruding portion of element 102. This switch may be used to reset the device if there is a malfunction and it jams, or it may be used for timing the start of rotation of spin motor 24.

The tension of spring 78 and air cylinder stroke may be varied to accommodate different bottles. With a given spring 78 and stroke, the force exerted may be varied by bodily moving the whole holding mechanism forward or rearward, thereby changing the amount of compression on the spring.

From the foregoing, it is apparent that this invention has provided apparatus by which all the objects and advantages herein mentioned can be attained. Other objects and advantages, and even further modifications of the invention, will become apparent to those of ordinary skill in the art upon reading this disclosure. However, it is to be understood that this disclosure is exemplary and not limitative, the scope of the invention being defined by the appended claims.

What is claimed is:

1. Apparatus for holding equipment used to sense a desired characteristic of a rotatable object, comprising:
   a pair of freely rotatable wheels,
   first yoke means for mounting said wheels spacedly to position said object,
   second yoke means,
   a pair of parallel rods transversely spaced and interconnecting said first and second yoke means,
   stationary means forming a support for at least part of said equipment and having means in which said rods are slidable,
   motor means secured to said stationary means, and
   single spring means coupling said motor means to said second yoke means in such a way as to cause said wheels to move in unison forwardly toward said object with the force of the spring means and rearwardly therefrom without that force when the motor means forces forward and rearward movement thereof.

2. In apparatus for sensing an out-of-round condition of a rotatable object, the improvement comprising the combination of:
   a pair of freely rotatable wheels spaced from one another and mounted on a first yoke which can be moved toward and away from said rotatable object for positioning the object with the pair of wheels,
   a pair of parallel rods which connect said first yoke means to a second yoke means,
   a transducer means having a movable sensing probe resiliently coupled to said first yoke means and positioned between said pair of wheels for contacting said object and detecting an out-of-round condition,
   a stationary support means for supporting the movable yoke combination and the pair of wheels and probe carried thereon, and including means for mounting said pair of parallel rods for movement back and forth relative to said rotatable object and said stationary support means, a motor means secured to said stationary support means for actuating said pair of wheels in movements toward and away from said object, and including means carried by said motor means for indirectly applying motions to the yokes, and a single spring means connected between said motor means and said second yoke in such a way as to cause said pair of wheels to move in unison forwardly toward said object with the force of said spring means, and to cause said pair of wheels to move rearwardly without the force of said spring means.

3. Apparatus as in claim 2 and further including means for adjusting the normal forward rearward position of said transducer.

References Cited by the Examiner

UNITED STATES PATENTS

| 1,625,766 | 4/1927 | Simpson | 33—178 |
| 2,833,046 | 5/1958 | Jeglum | 33—172 X |
| 3,071,247 | 1/1963 | Paruolo et al. | 209—88 |
| 3,080,659 | 3/1963 | Wolford | 33—174 |

FOREIGN PATENTS 655,248 12/1928 France.

LEONARD FORMAN, *Primary Examiner.*

SAMUEL S. MATTHEWS, *Assistant Examiner.*